3,459,749
Patented Aug. 5, 1969

3,459,749
ORALLY EFFECTIVE CEPHALOSPORIN ANTIBIOTIC
Earle M. Van Heyningen, Charles W. Ryan, and John L. Spencer, Indianapolis, Ind., assignors to Eli Lilly and Company, Indianapolis, Ind., a corporation of Indiana
No Drawing. Filed Apr. 25, 1968, Ser. No. 724,246
Int. Cl. C07d 99/24; A61k 21/00
U.S. Cl. 260—243    4 Claims

ABSTRACT OF THE DISCLOSURE

3 - methyl-7-[2'-(4"-nitrophenyl)acetamido]-3-cephem-4-carboxylic acid and pharmaceutically acceptable salts thereof, useful compounds effective against microbial infections and particularly of interest as oral antibiotics.

FIELD OF INVENTION

The compounds of this invention belong to the cephalosporin class of antibiotics. This class of antibiotics is characterized by the following structural formula:

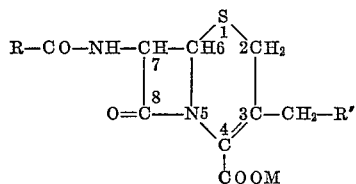

where R is an organic radical, R' includes hydrogen, acetoxy, tertiary amino, hydroxyl, and pyridine, and M is hydrogen or a pharmaceutically acceptable cation. The compounds of the cephalosporin class which have antibiotic activity are characterized by a β-lactam ring fused to a dihydrothiazine ring having a carbon-to-carbon double bond in the 3-position.

Whereas some compounds of the cephalosporin class have achieved recognition as commercially useful antibiotics for the treatment of various bacterial infections, there is a continuing need for more effective agents. The antibiotic 7-(2'-thienyl)- acetamidocephalosporanic acid sodium salt, for example, which has achieved wide commercial recognition for the effective treatment of various microbial infections, is generally administered intramuscularly or intravenously. There is a need for new and useful cephalosporin antibiotics which can be administered by the oral route.

An object of this invention is to provide persons in the cephalosporin antibiotic art with new cephalosporin compounds which are highly effective antibiotics that are of special interest for their unique activity as oral antibiotics.

A more specific object of the present invention is to provide certain particular cephalosporin compounds which are uniquely effective when administered by the oral route.

SUMMARY

The novel compounds of the present invention are the free acid and the pharmaceutically acceptable salts represented by the following structural formula:

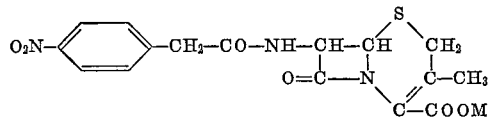

wherein M is hydrogen or a pharmaceutically acceptable cationic moiety.

The compounds of this invention are antibiotics of the cephalosporin class particularly useful because of their effectiveness when administered by the oral route. The compounds of this invention are also effective antibiotics when administered by the intramuscular or intravenous route.

DETAILED DESCRIPTION

The antibiotic substance of this invention can be prepared and used as the free acid; however, it can also be prepared and used in the form of salts prepared with pharmaceutically acceptable cations, including alkali metals such as sodium and potassium, alkaline earth meals, such as magnesium and calcium, and the ammonium and substituted ammonium cations such as those prepared from ammonium hydroxide, methylamine, ethylamine, diethylamine, triethylamine, monoethanolamine, diethanolamine, and the like. For intramuscular injection of the novel cephalosporin antibiotics, sparingly soluble salts thereof can be prepared with various amines by known methods. Amines useful for this purpose include benzylamine, dibenzylamine, 1,4-bis(aminomethyl)cyclohexane and the like and those described and known in the penicillin antibiotic art as useful for preparing sparingly soluble penicillin salt forms.

The free acid compound of the present invention, 3-methyl-7-[2'-(4"-nitrophenyl)acetamido] - 3 - cephem-4-carboxylic acid, also named 7-[2'-(4"-nitrophenyl)acetamido]desacetoxycephalosporanic acid, is related to cephalosporin C in that it contains a 5,6-dihydro-6H-1,5-thiazine ring with a fused β-lactam ring in the 5,6-position. The compound of this invention differs from cephalosporin C in that it lacks the 5-aminoadipamyl group in the 7-position and instead is characterized by the 4-nitrophenylacetamido group in the 7-position. In further contrast with the cephalosporin C structure, the present compound possesses a methyl group in the 3-position whereas an acetoxymethyl group is present in the 3-position of cephalosporin C. Moreover, unlike cephalosporin C, which has a relatively low antibacterial action, the compounds of the present invention are highly effective antibacterial agents, capable of inhibiting the growth of numerous types of organisms in a variety of environments at low concentrations.

Cephalosporin C, which is the most convenient starting material to make the compounds of this invention, can be prepared by cultivating a cephalosporin C-producing organism in a suitable nutrient medium as described in British patent specification 810,196, published Mar. 11, 1959. Cephalosporin C can also be prepared by the method described in U.S. Patent 3,082,155, issued Mar. 19, 1963, involving the use of a cephalosporin-producing mold of the species of which Cephalosporium I.M.I. 49137 is a member.

Cephalosporin C is readily converted into 7-aminocephalosporanic acid (7-ACA), by cleaving the 5-aminoadipoyl side chain therefrom. The cleavage reaction is conveniently carried out as described by Morin et al. in U.S. Patent 3,188,311, which issued June 8, 1965. The 7-aminocephalosporanic acid obtained thereby can be converted to 7- aminodesacetoxycephalosporanic acid (7-ADCA), the immediate precursor for the synthesis of the compounds of the instant invention, by hydrogenolysis of 7-ACA according to the precedure described in J. Med. Chem., 7,118 (1964).

The acid compound of the present invention, 3-methyl-7-[2'(4" - nitrophenyl)acetamido]-3-cephem-4-carboxylic acid, is prepared by the acylation of 7-ACA either as the free acid or as a pharmaceutically acceptable water-soluable salt such as those described in U.S. Patent 3,207, 755, issued Sept. 21, 1965. A convenient acylating agent for the preparation of the compounds of this invention is the 4-nitrophenylacetyl chloride or bromide. The acylation of 7-ADCA is carried out in water or an appropriate organic solvent preferably under substantially neutral pH conditions and preferably at or below room temperature. Temperatures of reaction from about 20° C. down to a temperature above the freezing point of the reaction mixture are suitable. In a typical acylation procedure, 7-ADCA is dissolved in aqueous 50 percent acetone together with sodium bicarbonate or other appropriate alkali in sufficient quantity to maintain the pH value of the reaction mixture between about 5 and about 9 throughout the course of the reaction and in sufficient quantity to promote salt formation. The solution obtained thereby typically has a 7-ADCA concentration of about 1 percent to about 4 percent by weight. This solution is cooled in an ice-bath to about 0° C. and the 4-nitrophenylacetyl halide is added with stirring. The reactioin mixture is stirred with cooling for about 1.5 hours and then allowed to warm to room temperature. The reaction mixture is then acidified to a pH of about 2, and the 3-methyl-7-[2'-(4"-nitrophenyl)acetamido] - 3 - cephem-4-carboxylic acid formed in the acylation reaction is extracted with ethyl acetate. The ethyl acetate extract is washed, dried, and evaporated to dryness to yield the product, 3-methyl-7-[2'-(4" - nitrophenyl)acetamido]-3-cephem-4-carboxylic acid.

Acylation of the 7-ADCA to yield the compounds of the present invention can also be carried out by employing 4-nitrophenylacetic acid in conjunction with a carbodiimide. For example, N,N'-diethylcarbodiimide, N,N'-dicyclohexylcarbodiimide, N,N' - di-n-propylcarbodiimide and the like, all possessing in common the moiety —N=C=N—, can be employed for the acylation of the present invention. Other suitable carbodiimides which can be employed are described by E. H. Flynn in U.S. Patent 3,252,973, which issued May 24, 1966.

The acylation of 7-ADCA to yield the compounds of this invention can also be carried out by utilizing the acid anhydride of 4-nitrophenylacetic acid or the mixed anhydride of 4-nitrophenylacetic acid and 4-nitrobenzoic acid.

The novel compounds of this invention have unique activity in that they are effective at low concentrations against infective organisms when administered by the oral route. In particular, the compounds are effective against penicillin-resistant staphylococcus organisms.

For example the potassium salt of 3-methyl-7-[2'-(4"-nitrophenyl)acetamido]-3-cephem - 4 - carboxylic acid, when tested inthe standard in vitro gradient-plate technique, is found to have minimum inhibitory concentrations (MIC) against four clinical isolates of pencillin-resistant *Staphylococcus aureus* of from 0.7 to 9.3 mcg./ml. in the presence of human serum and from 0.5 to 2.4 mcg./ml. in the absence of human serum. Penicillin G has a MIC against the same four clinical isolates of from 59 to 132 mcg./ml. in the absence of human serum and from 90 to 7,000 mcg./ml. in the presence of human serum as measured by the same test procedure. The gradient-pate technique used in the above MIC determinations is described by Bryson and Szybalski, Science, 116, 45 (1952).

The free acid compound of this invention, when administered orally to mice in two doses given at one and five hours respectively post-infection, has a median effective dose ($ED_{50}$) of less than 1.2 mg./kg. against β-hemolytic *Streptococcus pyogenes*, strain C203. The method used for determining the $ED_{50}$ value is described by W. Wick et al., Journal of Bacteriology, 81, No. 2, pp. 233–235, February 1961.

In the standard tube dilution technique for determining minimum inhibitory concentrations, the potassium salt of 3-methyl-7-[2'-(4"-nitrophenyl)acetamido] - 3 - cephem-4-carboxylic acid has a MIC of 0.39 mcg./ml. against *Streptococcus pyogenes* strain C203.

The oral efficacy of the antibiotics of this invention is further illustrated by the substantial blood levels attainable in mice following oral administration. For example, the potassium salt of 3-methyl-7-[2'-(4"-nitrophenyl)acetamido]-3-cephem-4-carboxylic acid was administered orally to two groups of four mice each at a dose of 20 mg./kg. per mouse. The first group of four mice were bled after 15 minutes and the blood samples assayed against the organism *Streptococcus pyogenes* strain C203. These samples had an average level of antibiotic of 1.2 mcg./ml. The second group of four mice were bled after 30 minutes and the samples assayed in the same manner. The average level of antibiotic in this group was 0.68 mcg./ml.

The compounds of this invention are effective antibiotics when administered in amounts of from about 2.5 mg./kg. to about 150 mg./kg. per day. The daily dose can be administered as a single dose or preferably in several smaller doses at convenient intervals throughout the day.

The above test procedures and the results thereof are indicative of the effectiveness of the compounds of this invention against clinically important infections.

The surprising oral activity of these compounds is believed to be attributable to their structural features which include the basic cephalosporin antibiotic nucleus substituted however in the 3-position with a methyl group and in the 7-position with the 4-nitrophenylacetamido group. It has been found according to this invention that the presence of the electronegative nitro substituent in the 4-position of the phenylacetamido moiety coupled with the 3-methyl substituent of the thiazine ring provides a resulting cephalosporin structure with surprisingly good antibiotic activity at low concentrations when administered by the oral route. However, we are not sure of the reason for this unique activity, and do not wish to be bound to any particular theory or reason for this demonstrated activity.

The compounds of this invention are further illustrated by the following detailed examples:

Example 1

7 - aminodesacetoxycephalosporanic acid (7 - ADCA), 2.1 g. (0.01 mole), was dissolved in a solution of 1.7 g. (0.02 mole) of sodium bicarbonate in 50 ml. of acetone and 50 ml. of water. The resulting clear solution was cooled in an ice-bath and 2.0 g. (0.01 mole) of 4-nitrophenylacetyl chloride were added with stirring. The reaction mixture was stirred in the cold for 1.5 hours; 100 ml. of ethyl acetate were then added and the pH was adjusted to 2 with concentrated hydrochloric acid. The ethyl acetate layer was separated and washed successively with water and a saturated sodium chloride solution. The ethyl acetate layer was then dried over magnesium sulfate, filtered, and evaporated to dryness, yielding 3-methyl-7-[2'-(4" - nitrophenyl)acetamido]-3-cephem-4-carboxylic acid as a residue.

The crude product was dissolved in 25 ml. ethanol and precipitated as the potassium salt by the addition of 2.0 g. of potassium acetate dissolved in 25 ml. of ethanol. The precipitated 3-methyl - 7 - [2'-(4"-nitrophenyl)acetamido]-3-cephem-4-carboxylic acid potassium salt was filtered off and dried, yielding 1.95 g. as the monohydrate.

*Analysis.*—Calculated for $C_{16}H_{14}N_3O_6K \cdot H_2O$: C, 44.23%; H, 3.68%; N, 9.67%. Found: C, 44.16%; H, 4.15%; N, 9.38%. Ultraviolet absorption: $A_M$ 257= 16,250.

The compound had a pK'a of 5.80 by electrometric titration. The NMR and IR spectra of the compound are in agreement with the structure indicated above.

Example 2

Following the procedures of Example 1 for the preparation of the free acid the sodium salt of 3-methyl-7-[2'-(4" - nitrophenyl)acetamido]-3-cephem-4-carboxylic acid is prepared by the addition of a solution of 2 g. of sodium acetate dissolved in 25 ml. of methanol to a solution of 3 - methyl - 7 - [2' - (4'' - nitrophenyl)acetamido] - 3-cephem-4-carboxylic acid in ethanol.

We claim:
1. A compound of the formula

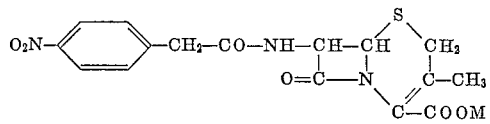

wherein M is hydrogen or a pharmaceutically acceptable cation.

2. A compound as in claim 1, wherein M is hydrogen.
3. A compound as in claim 1, wherein M is potassium.
4. A compound as in claim 1, wherein M is sodium.

References Cited

UNITED STATES PATENTS 3,157,648  11/1964  Collins.
3,382,241  5/1968   Flynn.

NICHOLAS S. RIZZO, Primary Examiner

U.S. Cl. X.R.

424—246